United States Patent
Philippot

(10) Patent No.: US 8,602,734 B2
(45) Date of Patent: Dec. 10, 2013

(54) IMPELLER WHICH INCLUDES IMPROVED MEANS OF COOLING

(75) Inventor: Vincent Philippot, Solers (FR)

(73) Assignee: Snecma, Paris (FR)

( * ) Notice: Subject to any disclaimer, the term of this patent is extended or adjusted under 35 U.S.C. 154(b) by 711 days.

(21) Appl. No.: 12/844,288

(22) Filed: Jul. 27, 2010

(65) Prior Publication Data

US 2011/0027103 A1 Feb. 3, 2011

(30) Foreign Application Priority Data

Jul. 31, 2009 (FR) ...................................... 09 55392

(51) Int. Cl.
*F01D 5/08* (2006.01)

(52) U.S. Cl.
USPC .... 416/97 R; 416/96 R; 416/97 A; 416/96 A; 416/220 R; 415/115

(58) Field of Classification Search
USPC .............. 416/97 R, 97 A, 96 A, 96 R, 220 R; 415/115
See application file for complete search history.

(56) References Cited

U.S. PATENT DOCUMENTS

| 3,834,831 | A | | 9/1974 | Mitchell | |
|---|---|---|---|---|---|
| 5,135,354 | A | * | 8/1992 | Novotny | 415/115 |
| 5,222,865 | A | * | 6/1993 | Corsmeier | 416/193 A |
| 5,388,962 | A | * | 2/1995 | Wygle et al. | 416/95 |
| 6,655,920 | B2 | * | 12/2003 | Beutin et al. | 416/198 A |
| 7,207,776 | B2 | * | 4/2007 | Townes et al. | 416/95 |

FOREIGN PATENT DOCUMENTS

| EP | 1 264 964 A1 | 12/2002 |
|---|---|---|
| GB | 2 409 240 A | 6/2005 |

* cited by examiner

*Primary Examiner* — Igor Kershteyn
(74) *Attorney, Agent, or Firm* — Oblon, Spivak, McClelland, Maier & Neustadt, L.L.P.

(57) ABSTRACT

An impeller for a turbine engine which includes a disk provided with blade retention teeth, wherein associated with each tooth there is a mechanism for channelling a flow of cooling air which covers the crest of the tooth so that the latter is swept by the air flow. A turbine of turbine engine which includes an impeller of this type, and a turbine engine for aircraft which includes a turbine of this type.

10 Claims, 2 Drawing Sheets

IMPELLER WHICH INCLUDES IMPROVED MEANS OF COOLING

TECHNICAL FIELD

The present invention relates to the field of impellers, in particular in turbines in turbine engines, such as aircraft turbo-jet engines.

The invention relates more specifically to the cooling of the crests of the teeth of the disk of these impeller wheels, which are used to retain their blades.

THE STATE OF THE PRIOR ART

The rotor of gas turbines includes one or more impellers made to rotate by a gas flow, flowing from upstream to downstream within these turbines.

Each impeller includes a disk fitted with peripheral teeth, which demarcate recesses between each other in which the tongues of the blades are held.

The temperature of the gases which flow in the turbines is in general high, in particular at the inlet to low pressure turbines fitted at the outlet of the combustion chamber in twin-shaft turbine engines, so that the disk of the impeller may be subjected to a radial thermal gradient which is detrimental to the service life of this disk.

For this reason, it is known for impeller disks, in particular those arranged at the inlets to turbines, to be equipped with a side plate which is used to guide a flow of cooling air radially towards the exterior on one side of the disk, where this flow is then compelled to circulate in the bottom of said recesses of the disk, in the direction of the opposite flank of this disk.

This method of cooling the impeller disk is sometimes, however, shown to be insufficient, in particular when the temperature of the flow of gases driving the rotor reaches such a value that the thermal gradient resulting from this in the side plate causes it to deform in such a way that its gas-tightness, and therefore its capacity to cool the disk, is reduced.

Furthermore, the method of cooling described above does not provide cooling of the peripheral teeth of the disk, which are, however, the hottest part of the disk since they are very close to the flow of hot gases flowing in these turbines.

This method of cooling does not therefore allow the radial thermal gradient in the disks to be reduced in an optimum manner, and could even result in the thermal gradient between the crests of the teeth, which are heated by the hot gases which are flowing in the turbines, and the bases of the teeth, which are cooled by the flow of cooling air, becoming more marked.

PRESENTATION OF THE INVENTION

The aim of the invention is in particular to provide a simple, economic and effective solution to these problems which allows at least part of the aforementioned drawbacks to be avoided.

In particular it aims to reduce thermal gradients in gas turbine impeller disks such as in the low pressure turbines of aircraft turbine engines.

To this end the invention proposes an impeller for turbine engines which equipped includes a disk provided with blade retention teeth, in which with each tooth there is associated means of channelling a flow of cooling air, said means covering, at least partly, the crest of said tooth so that this crest is swept over by said flow of air, where said impeller includes a side plate fitted facing a first side of the disk so that it demarcates with the latter an annular cavity intended to allow said air flow to flow radially towards the exterior, where said side plate includes axial tongues which project towards a second side of the disk opposite the first side from a radial annular part of the side plate in such a way as to form said means of channelling, where said impeller includes an annular sealing ring pressed against said first side of the disk, inside said annular cavity demarcated by the side plate and opposite the bottom of the recesses formed between the teeth of the disk, so as to prevent circulation of air at the bottom of these recesses.

The means of channelling are used to demarcate overall axial passages which respectively cover the crests of the teeth in the disk and which are designed for the passage of the aforementioned flow of cooling air.

The crests of the disk teeth participate in the demarcation of these passages so that said crests can be swept by the flow of cooling air.

The means of channelling therefore allow the crest of each tooth of the disk to be cooled.

Because the crests of the teeth are the hottest parts of the disk in operation, the means of channelling allow optimum cooling of the disk and optimum reduction of the radial thermal gradient in this disk.

The axial tongues of the side plate allow a passage to be demarcated along the crest of each tooth to permit the circulation of the cooling air flow along said crest.

The side plate may, in addition, be used for the axial retention of the tongues of the blades in axial recesses demarcated by the teeth in the disk.

The sealing ring is used to block off the bottoms of the recesses and thus compel the flow of cooling air to pass radially towards the exterior up to the crests of the teeth in the disk.

The entire aforementioned cooling air flow is thus used to good advantage to ensure optimum cooling of the crests of the teeth of the disk.

The sealing ring is preferably formed by a split ring.

Each axial tongue of the side plate preferably extends to a radial distance from the crest of the corresponding tooth in the disk which is between 0.2 millimetres and 0.5 millimetres.

The axial tongues of the side plate are advantageously formed at one radially external end of the side plate.

Thus the side plate may be swept over and cooled by the flow of cooling air over its entire radial extent in order to achieve maximum reduction of the risks of deformation and of loss of efficiency of the side plate in operation.

Preferentially, with each tooth in the disk there is associated one of the axial tongues of the side plate, which said axial tongue preferably extends on a level with said tooth of the disk so as to demarcate, with two blades adjacent to this tooth and with the crest of this tooth, a passage for the cooling air flow.

This passage preferably opens out on said second side of the disk.

In a preferential embodiment of the invention, the radial annular part of the side plate is pressed up against the sealing ring and includes, on its surface pressed up against this sealing ring, grooves which form air circulation channels between the side plate and the sealing ring which allow the cooling air to flow beyond the sealing ring radially towards the exterior.

These channels connect the annular cavity demarcated by the side plate to the passages respectively demarcated by the axial tongues of the ring.

The aforementioned grooves preferably extend radially.

The side plate preferably includes an annular rib protruding towards the disk and radially internal in relation to the sealing ring, in order to radially retain the latter.

In the preferred embodiment of the invention, the side plate includes a radially internal annular fixing flange fixed to an annular flange of the disk.

These flanges may advantageously carry means for balancing the disk in rotation.

In the preferred embodiment of the invention, the side plate fixing flange includes, on its surface facing the disk flange, grooves which form air inlet channels between the side plate fixing flange and the disk flange, which open into the annular cavity demarcated by the side plate.

These grooves in the side plate fixing flange preferably extend radially.

The invention also relates to a turbine of a turbine engine including an impeller of the type described above.

This impeller is preferably mounted so that said first side of its disk is arranged on the upstream side of the impeller.

This facilitates the drawing off of a flow of cooling air upstream of this impeller.

When the impeller conforms to the preferred embodiment of the invention, the air inlet channels formed between the side plate fixing flange and the flange of the disk of this impeller preferably connect with an annular cavity upstream of the turbine, in which a flow of cooling air circulates.

The invention relates in addition to an aircraft turbine engine including a turbine of the type described above.

This turbine engine is, for example, an aircraft twin-shaft turbo-jet engine in which said turbine forms a low pressure turbine.

It is particularly advantageous for the first stage at least of this turbine, that is, the stage that is furthest upstream, to include an impeller of the type described above. It is, in effect, this stage that the hot gases from the aforementioned turbo-jet engine's combustion chamber first meet in the low pressure turbine of this turbo-jet engine, and it is therefore the stage that is subjected to the strongest thermal stresses.

BRIEF DESCRIPTION OF THE DRAWINGS

The invention will be more readily understood and other of its details, advantages and characteristics will appear on reading the following description, which is given as an example only and is in no way restrictive, whilst referring to the appended drawings in which.

In these figures, identical or similar components are designated using identical numerical references.

DETAILED DESCRIPTION OF A PREFERRED EMBODIMENT

Figure 1:
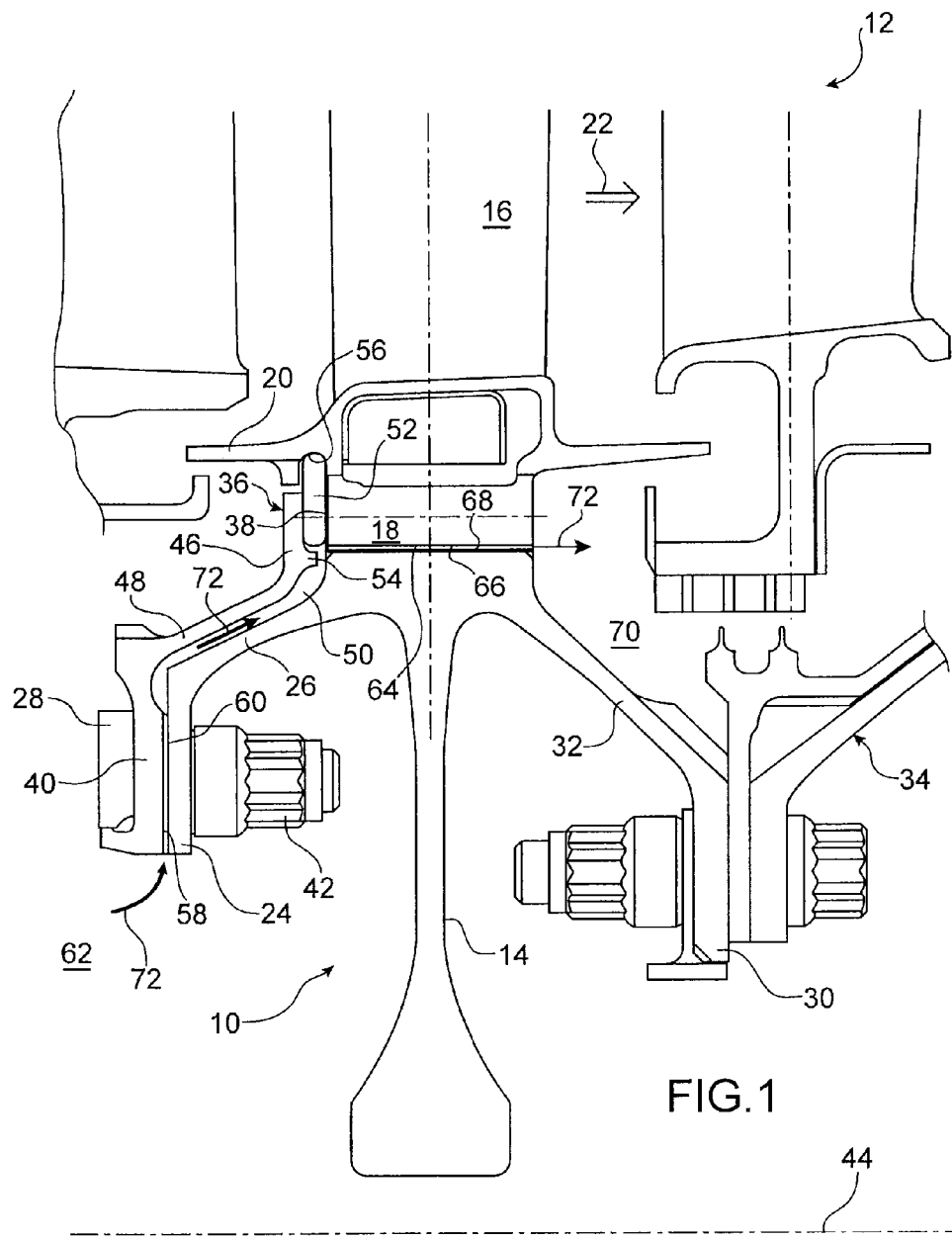
FIG. 1 is a partial schematic half-section in axial cross section of a turbine engine which includes an impeller of a known type, along a sectional plane which is coincident with a median plane of a foot of a blade of this impeller.

FIG. 1 represents an impeller 10 of a known type which forms the first stage of the rotor of a low pressure turbine 12 in a dual-flow, twin-shaft turbo-jet engine.

In a conventional manner, this low pressure turbine 12 is mounted at the outlet of a high pressure turbine, itself mounted at the outlet of an annular combustion chamber (not visible in FIG. 1).

The impeller 10 includes a disk 14 equipped at its radially external periphery with teeth, which circumferentially demarcate axial recesses between each other, whose section is in the shape, for example, of a dovetail, and blades 16 each of which includes a foot 18 engaged and held with play in one of the aforementioned recesses.

Each blade 16 includes at its base a platform 20 intended in particular to guide, from upstream towards downstream in the turbine 12, that is, from the inlet towards the outlet of the turbine, a primary flow 22 of gases coming from the aforementioned combustion chamber.

The disk 14 includes an annular upstream flange 24 which is connected to the disk by a truncated conical wall 26 and which carries means 28 for balancing the disk 14.

The disk 14 also includes an annular downstream flange 30 which is connected to the disk by a truncated conical wall 32 and which is fixed to another disk 34 of the rotor of the turbine 12.

The impeller 10 in addition includes an annular side plate 36, mounted on the upstream side 38 of the disk 14 and which is in particular intended to axially retain the feet 18 of the blades 16. This side plate 36 includes a radially internal flange 40 fixed to the upstream flange 24 of the disk 14 by bolts 42 distributed around the axis 44 of the turbine, and a radially external annular part 46 which extends facing and at a distance from the upstream side 38 of the disk 14 and which is connected to said flange 40 of the side plate 36 by an annular wall 48 of the side plate which is for example of truncated conical form and which extends facing and at a distance from the truncated conical wall 26 of the disk 14. The side plate 36 thus demarcates, with the upstream side 38 and the truncated conical wall 26 of the disk 14, an annular cavity 50 intended for a flow of cooling air for cooling the disk 14, as will be seen more clearly below.

The impeller 10 also includes an annular sealing ring 52 formed from a split ring and inserted between the upstream side 38 of the disk 14 and the side plate 26 in the annular cavity 50, in front of the recesses in the disk, in order to achieve axial retention of the feet 18 of the blades 16.

The side plate 36 includes a rib 54 which protrudes towards the disk 14, that is, towards the downstream direction in the example shown, which is formed approximately opposite the bottom of the recesses in the disk 14, to provide radial retention of the sealing ring 52 in a position which is radially offset towards the exterior in relation to the bottoms of the recesses, so as to allow circulation of air between the annular cavity 50 and the bottoms of the recesses.

The platform 20 of each blade 16 includes a circumferential groove 56 which opens radially towards the interior in the turbine, and whose bottom forms an end-stop intended to prevent the sealing ring 52 opening in operation due to the effect of the centrifugal force induced by the rotation of the impeller 10.

The flange 40 of the side plate 36 includes radial grooves 58, sometimes referred to as half-moons, which are made in the face 60 of this flange 40 which is pressed against the flange 24 of the disk 14, that is, in its downstream face in the example represented in FIG. 1. These grooves 58 extend over the radial extent of the flange 40 of the side plate so as to connect the annular cavity 50 with a radially internal annular space 62 of the turbine 12 located upstream of the impeller 10. These grooves 58 thus form air inlet channels into the annular cavity 50.

In operation, the primary flow 22 of hot gases from the combustion chamber cause heating of the teeth 18 of the disk 14 and induce an approximately radial thermal gradient in this disk 14.

The feet 18 of the blades 16 are subjected to a centrifugal force due to the rotation of the rotor, so that each of the feet 18 is retained in the corresponding recess of the disk 14 whilst creating a gap 64 between the radially internal end 66 of the foot 18 and the bottom 68 of said recess due to the assembly play of this foot 18 in the recess. This gap 64 at the bottom of the recess opens out into an annular space 70 located downstream of the impeller 10.

Because of a pressure differential between the upstream annular space 62 and the downstream annular space 70, a flow of relatively cool air 72, coming from an upstream part of the turbo-jet engine, and which supplies the upstream annular space 62, circulates from this upstream annular space 62 towards the downstream annual space 70 passing successively into the inlet channels of the annular cavity 50 formed by the grooves 58 in the flange 40 of the side plate 36, then into the annular cavity 50 between the side plate 36 and the disk 14, and finally along the respective bottoms 68 of the recesses in this disk 14 due to the obstruction of the radially external end of the annular cavity 50 caused by the sealing ring 52.

This circulation of cool air means that the respective bottoms of the recesses of disk 14 are cooled.

Figure 2:
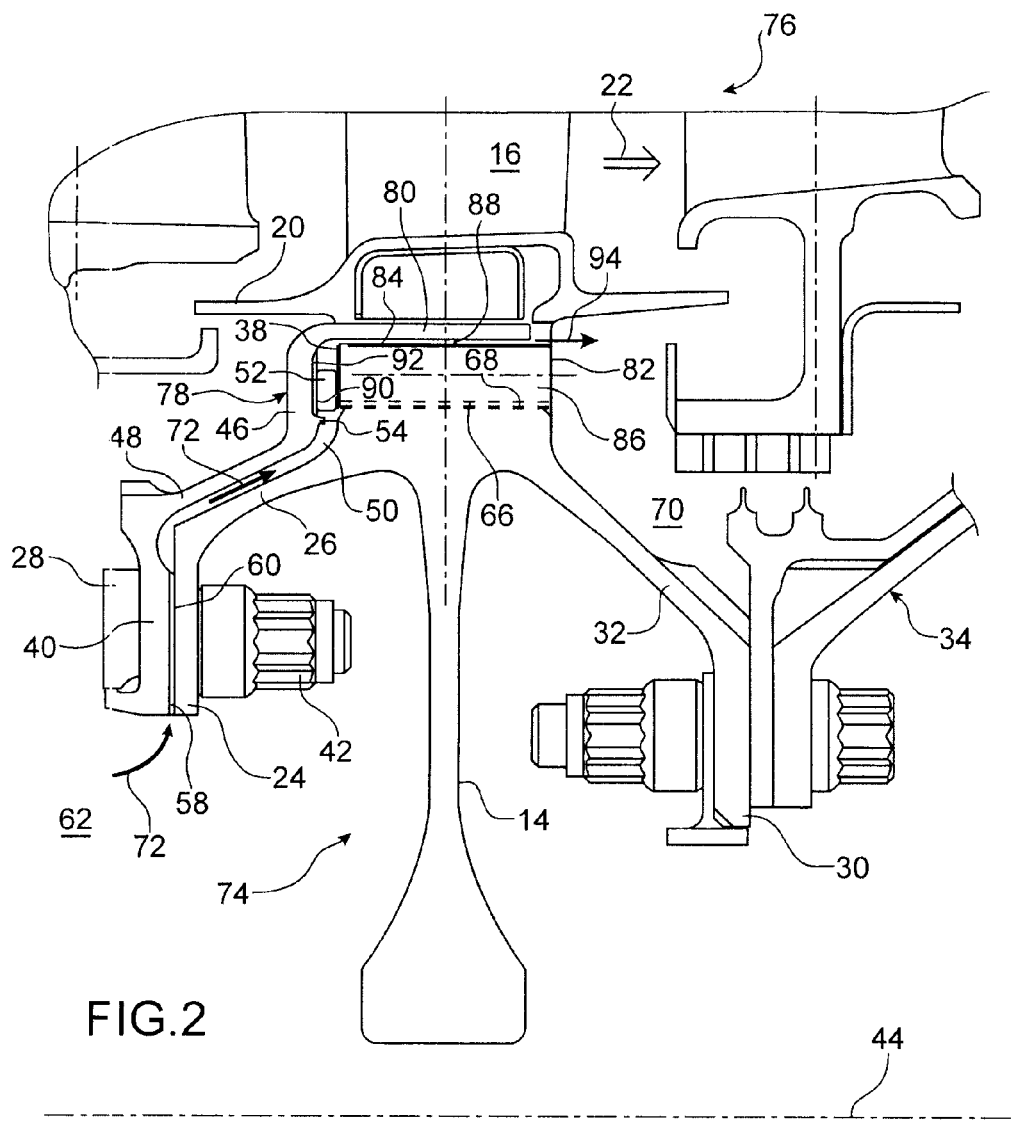
FIG. 2 is a partial schematic half-section in axial cross-section of a turbine engine which includes an impeller according to the invention, along a sectional plane which is coincident with a median plane of a tooth in the disk of this impeller.

FIG. 2 represents an impeller 74 in a turbine 76 of a dual-flow, twin-shaft turbo-jet aircraft engine. This impeller 74 differs from the impeller 10 described above in that it includes an annular side plate 78 which is in accordance with a preferred embodiment of the invention.

The side plate 78 of the impeller 74 differs from the side plate 36 in FIG. 1 in that it includes at its radially external end a plurality of axial tongues 80 which extend out from the radial annular part 46 of the side plate 78 towards the side 82 of the disk 14 which is opposite to that side 38 of the disk on which the side plate 78 is mounted, that is, towards the downstream direction in the example represented in FIG. 2. The axial tongues 80 are arranged so that the crest 84 of each tooth 86 of the disk 14 is covered by a corresponding one of said axial tongues 80.

Each axial tongue 80 extends radially to a distance of about 0.3 mm from the crest 84 of the corresponding tooth 86, and passes between the upstream skirts (not visible in FIG. 2) of the platforms 20 of two blades 16 arranged on either side of this tooth 86. Each axial tongue 80 thus demarcates, with the feet of the two corresponding blades 16, a passage for the circulation of air 88 which covers the crest 84 of the corresponding tooth 86.

The upstream skirts of the platforms 20 of the blades 16 have a limited circumferential extent in comparison with the conventional type blades, so as to allow for passage of the axial tongues 80 of the side plate 78, as explained above.

The axial tongues 80 of the side plate 78 are connected together by a radially external edge of this side plate 78 (not visible in FIG. 2) which fit to form more or less a seal with the upstream skirts of the platforms 20.

The rib 54 of the side plate 78 is formed at a distance from the axis 44 of the turbine which is selected to allow the sealing ring 52 to be positioned opposite the bottoms 68 of the recesses in the disk 14.

In addition, the side plate 78 includes on the face 90 of its radial annular part 46 which is pressed against the sealing ring 52, that is, on its downstream face in the example represented, radial grooves 92 which form channels intended to connect the annular cavity 50 and the passages for circulation of air 88 which cover the peaks 84 of the teeth 86.

In operation, a flow of cooling air 72 enters the annular cavity 50 through the air inlet channels formed by the grooves 58 in the flange 40 of the side plate 78, in a manner which is analogous to that which has been described with reference to FIG. 1.

However, the sealing ring 52 blocks any passages that may be formed at the bottom 68 of the recesses by the displacement of the feet of the blades 16 radially towards the exterior due to the effect of centrifugal force induced by rotation of the impeller 74.

The cooling air is therefore compelled to flow radially towards the exterior in the channels formed by the grooves 92 in the face 90 of the radial annular part 46 of the side plate 78, and circulate in a downstream direction in the air circulation passages 88 which cover the crests 84 of the teeth 86, to the downstream annular cavity 70, as the arrow 94 in FIG. 2 illustrates.

The flow of air 72 channelled by the axial tongues 80 is thus used to cool the crests 84 of the teeth 86.

This cooling of the crests 84 of the teeth 86 allows the radial thermal gradient in the disk 14 to be reduced more effectively than the cooling of the respective bottoms 68 of the recesses made in the impeller 10 of known type in FIG. 1, in accordance with what has been explained above.

This method of cooling of the disk 14 also allows the thermal gradient in the side plate 78 to be reduced and thus reduce the risk of deformation and of loss of efficiency of this side plate 78.

The invention claimed is:

1. An impeller for a turbine engine which includes a disk provided with blade retention teeth, comprising with each tooth, channeling means for channelling a flow of cooling air, said channeling means covering, at least partially, the crest of said tooth so that said crest is swept over by said air flow, wherein said impeller includes a side plate fitted facing a first side of the disk so as to demarcate with the latter an annular cavity intended for the flow of said air flow radially outwards, where said side plate includes axial tongues which project towards a second side of the disk, opposite to said first side, from a radial annular part of the side plate in such a way as to form said channelling means, where said impeller includes an annular sealing ring pressed against said first side of the disk, inside said annular cavity demarcated by the side plate and opposite the bottom of recesses formed between the teeth of the disk, so as to prevent circulation of air at the bottom of said recesses.

2. The impeller according to claim 1, wherein said axial tongues of the side plate are arranged at a radially external end of this side plate.

3. The impeller according to claim 1, wherein said radial annular part of the side plate is pressed up against the sealing ring and includes, in its surface pressed up against said sealing ring, grooves which form air circulation channels between the side plate and the sealing ring which allow the flow of cooling air to flow beyond the sealing ring radially towards the exterior.

4. The impeller according to claim 3, wherein the side plate includes an annular rib protruding towards the disk and radially internal in relation to the sealing ring, in order to radially retain the latter.

5. The impeller according to claim 1, wherein the side plate includes a radially internal annular fixing flange fixed to an annular flange of the disk.

6. The impeller according to claim 5, wherein said fixing flange of the side plate includes on its surface facing the disk flange, grooves which form air inlet channels between the side plate fixing flange and the disk flange, which open into the annular cavity demarcated by the side plate.

7. A turbine of turbine engine, including an impeller according to claim 1.

8. The turbine according to claim 7, wherein said impeller is mounted so that said first side of its disk is arranged on the upstream side of the impeller.

9. A turbine of turbine engine, including an impeller according to claim 6, wherein the air inlet channels formed between the fixing flange of the side plate and the flange of the disk of said impeller connect with an upstream annular cavity of the turbine in which a flow of cooling air circulates.

10. A turbine engine for aircraft, including a turbine according to any one of claims 7 to 9.

* * * * *